Feb. 24, 1970         W. A. VAN WICKLIN, JR         3,497,269
                HYDRAULIC PRESSURE REGULATOR DEVICE
Filed July 25, 1968                                3 Sheets-Sheet 1
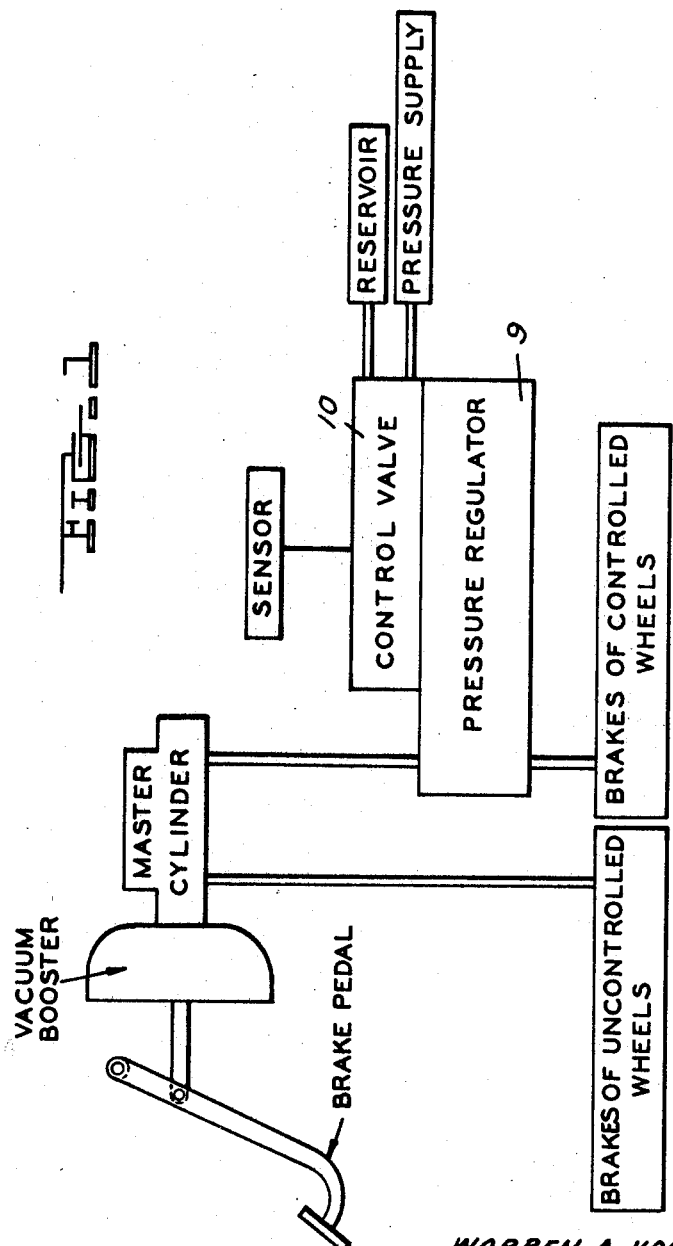
INVENTOR.
WARREN A. VAN WICKLIN, JR.
BY
ATTORNEYS Feb. 24, 1970  W. A. VAN WICKLIN, JR  3,497,269
HYDRAULIC PRESSURE REGULATOR DEVICE
Filed July 25, 1968  3 Sheets-Sheet 2
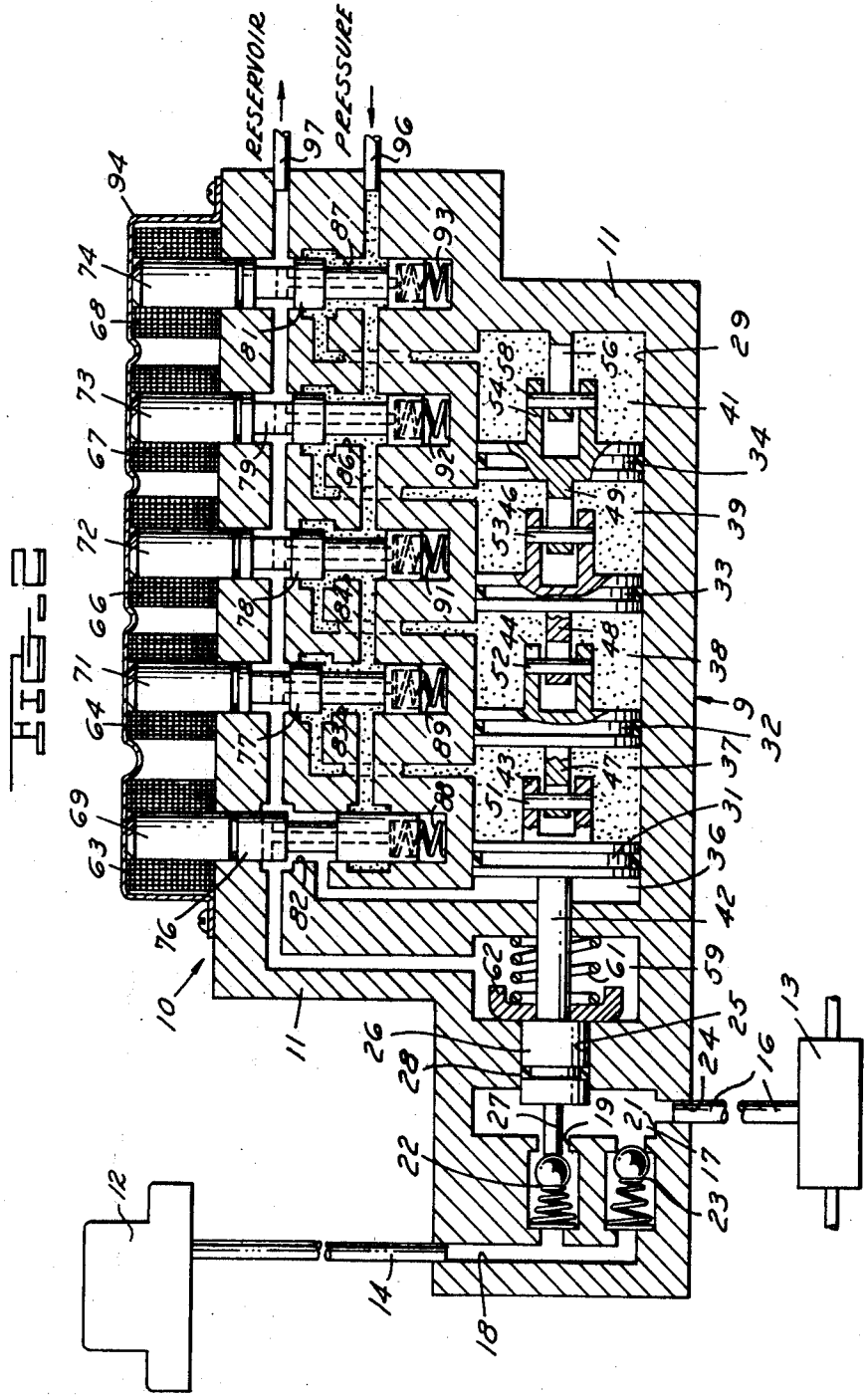
INVENTOR.
WARREN A. VAN WICKLIN, JR
BY
John R. Faulkner
Clifford L. Sadler
ATTORNEYS

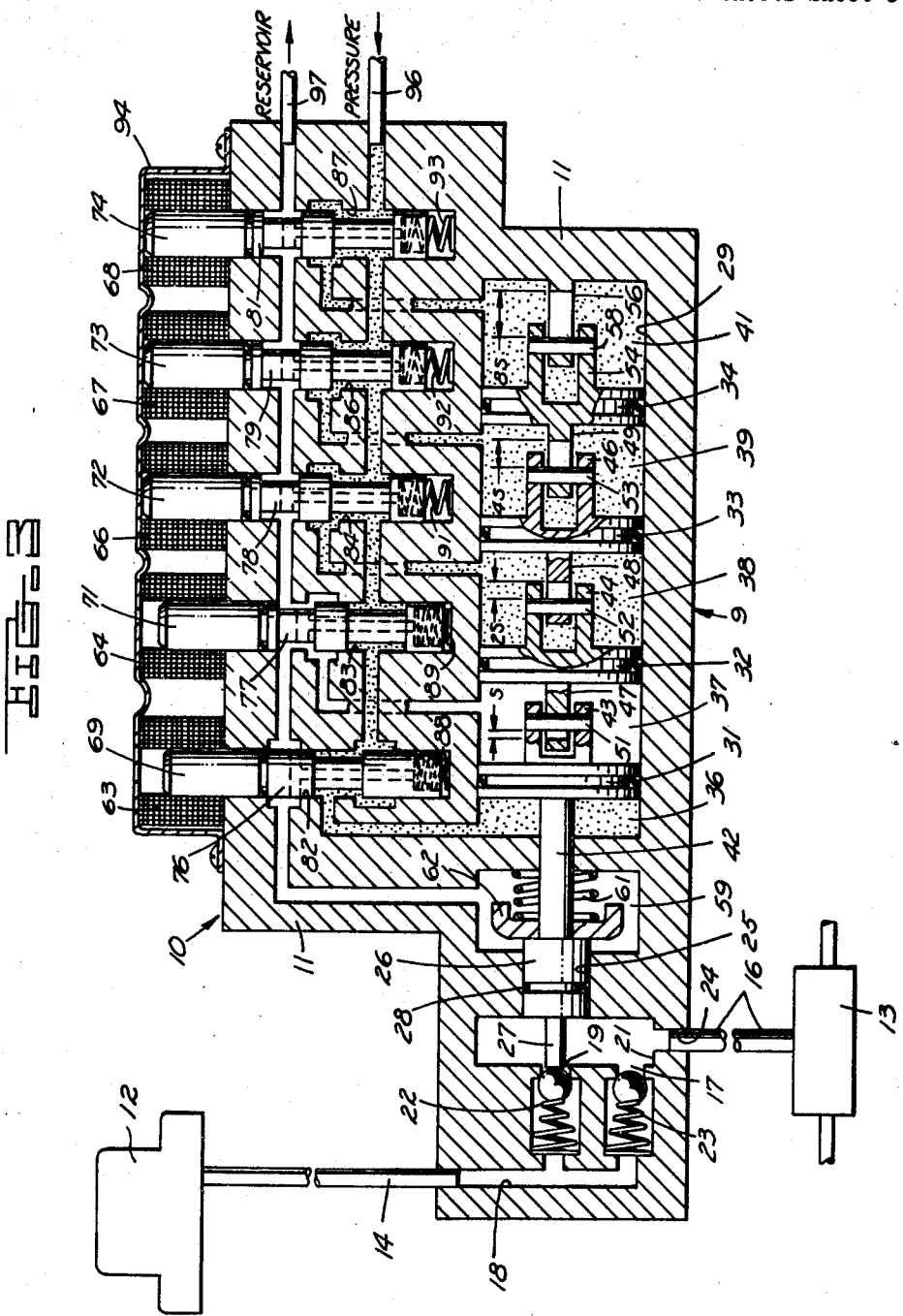

United States Patent Office 3,497,269
Patented Feb. 24, 1970

3,497,269
HYDRAULIC PRESSURE REGULATOR DEVICE
Warren A. Van Wicklin, Jr., Dearborn, Mich., assignor to Ford Motor Company, Dearborn, Mich., a corporation of Delaware
Filed July 25, 1968, Ser. No. 747,595
Int. Cl. B60t 8/02
U.S. Cl. 303—21                                    10 Claims

ABSTRACT OF THE DISCLOSURE

A hydraulic pressure regulator which modulates the brake line pressures of an antiskid hydraulic brake system. The regulator includes an in-line chamber having a volume variable by movement of a control piston and a number of collapsible, normally pressurized fluid compartments separated by loosely linked divider pistons. Axial movement of the pressure control piston is achieved when one or a combination of the compartments is vented to a reservoir at atmospheric pressure, causing the vented compartments to collapse, thereby shortening the total divider piston linkage length and withdrawing a portion of the control piston from the chamber.

BACKGROUND OF THE INVENTION

A conventional hydraulic brake system includes a master cylinder and at least one wheel cylinder. The system has a fixed volume; therefore, a given displacement from the master cylinder produces an identical total displacement in the wheel cylinders. During emergency braking, the vehicle operator often applies excessive force to the brake pedal causing wheel lock, vehicle slewing and general loss of control.

It has been found that directional stability of the vehicle may be retained if wheel lock, at least that of the rear wheels, is prevented by a suitable antiskid device. Such an antiskid device operates by releasing the brakes before the wheels lock and reapplying them when the wheels speed up again.

In presently known antiskid brake systems, a sensor measures the behavior of the controlled wheel to detect wheel skid. Upon detection of an undesirable degree of wheel skid, the sensor output actuates a brake pressure regulator which isolates the brake line pressure from the central pressure source and reduces the pressure to the controlled wheel. Usually, the pressure regulator is an on-off mechanism that allows the pressure to the controlled wheel to be at either the central brake line pressure or at atmospheric pressure. When an on-off regulator is used, the skid is controlled through a sequence of brake applications similar to what is achieved by a driver "pumping" his brakes. Though directional stability is achieved, the ideal, theoretical minimum stopping distance cannot be attained since the brake torque is released during portions of the cycle.

Another approach is to use a sophisticated servomechanism which permits full, infinitely variable modulation of the pressure to the controlled wheel as a function of the output magnitude of the sensor signal. Although such means are economically justifiable in multi-million dollar heavy aircraft applications, they are generally not practical for passenger cars.

The present invention provides a compromise between the above outlined limits. The invention improves braking performance and stopping distance over the known single step, on-off regulators and approaches the performance of a fully modulated servomechanism. Furthermore, the invention provides multiple step control of wheel brake torque by means of a device economical to produce and reliable in operation.

SUMMARY OF THE INVENTION

A hydraulic pressure regulator device constructed in accordance with this invention includes a chamber formed in a housing in communication with the lines of the hydraulic system. A movable means is mounted within the housing and is constructed upon movement to increase and decrease the volume of the chamber. A second means is constructed to displace the movable means in discrete incremental intervals and thus to increase or decrease the volume of the chamber in corresponding discrete incremental intervals.

BRIEF DESCRIPTION OF THE DRAWINGS

FIGURE 1 illustrates a schematic diagram of a hydraulic brake system embodying the invention.

FIGURE 2 illustrates a cross-sectional view of a preferred embodiment of the pressure regulator and the adjoining control valve, shown schematically in FIGURE 1. The elements are shown in normal, nonskid positions.

FIGURE 3 illustrates a cross-sectional view similar to FIGURE 2, but showing the relationship of the elements during a mild skid condition.

DETAILED DESCRIPTION OF A PREFERRED EMBODIMENT

In FIGURES 2 and 3 of the drawings, a pressure regulator and a control valve for an antiskid hydraulic brake system are referred to generally by numerals 9 and 10, respectively. Both the pressure regulator 9 and its control valve 10 may be located in a common housing 11. A master cylinder is illustrated schematically by reference numeral 12; a wheel cylinder, by reference numeral 13. Hydraulic lines 14 and 16 connect the housing 11 with master cylinder 12 and wheel cylinder 13, respectively. A chamber 17 is formed within housing 11. A passage 18 having two ports 19 and 21 links hydraulic line 14 and chamber 17. A pair of ball and spring check valves 22 and 23 are engageable with ports 19 and 21, respectively, to isolate the wheel cylinder fluid pressure from the master cylinder fluid pressure under circumstance to be later described. A third port 24 leads from chamber 17 through hydraulic line 16 to wheel cylinder 13.

A piston means 26 is slidingly mounted in bore 25 of housing 11 having one end defining a portion of chamber 17. An O-ring seal 28 situated in a groove of piston 26 prevents loss of hydraulic fluid and pressure from chamber 17 into other parts of housing 11. The volume of chamber 17 is variable in relation to the axial position of piston means 26 within bore 25. A rod 27 extends axially from piston means 26 into chamber 17 and, during normal nonskid operation of the brake system, engages the ball of check valve 22 to hold it in an open position as shown in FIGURE 2, thereby permitting free passage of hydraulic fluid into and out of chamber 17 from line 14.

An elongated cylindrical enclosure 29 is formed within housing 11 coaxial with piston means 26. A series of loosely connected divider pistons 31, 32, 33 and 34 are slidingly received within the cylindrical enclosure 29 and together with enclosure 29 define a series of variable volume compartments designated 36, 37, 38, 39 and 41. More particularly, compartment 36 is defined by the lefthand end portion of enclosure 29 and by piston 31. Compartment 37 is defined by a portion of enclosure 29 and pistons 31 and 32. Compartment 38 is defined by another portion of cylindrical enclosure 29 and pistons 32 and 33. Similarly, compartment 39 is situated within the axial limits of pistons 33 and 34. The last compartment 41 is defined by the righthand end of enclosure 29 and piston 34.

Piston 31 is rigidly connected to piston means 26 by connecting rod 42. Lost-motion means are provided to axially interconnect the pistons 31, 32, 33 and 34. The lost-motion means consist of a series of clevices 43, 44 and 46, slotted tongues 47, 48 and 49, and pins 51, 52 and 53. Piston 34 also has a rightwardly extending clevice 54 which receives a tongue 56 extending from the righthand end of enclosure 29 and which is connected to tongue 56 by pin 58.

The slots of tongues 47, 48, 49 and 56 are of different lengths so as to achieve an appropriate discrete interval combination. The slot of tongue 47 is of a length which permits piston 32 to move an axial amount S relative to piston 31, where S is an axial length determined as a function of the desired volume variation of chamber 17. The slot of tongue 48 is of a length which permits piston 33 to move an axial amount 2S relative to piston 32. Similarly, piston 34 is moveable relative to piston 33 an amount 4S. Finally, piston 34 is moveable relative to tongue 47 an amount 8S. The function of these varying length slots will be described in later paragraphs.

An additional chamber 59 is formed in housing 11 immediately between piston means 26 and piston 31. A spring 61 and thrust washer 62 are received within chamber 59 and about connecting rod 42 so as to bias piston 26 leftwardly towards chamber 17. Chamber 59 is at reservoir (atmospheric) pressure at all times.

The foregoing paragraphs describe the construction of the pressure regulator 9. Integral with pressure regulator 9 in housing 11 is a control valve 10 which operates to pressurize and depressurize compartments 36, 37, 38, 39 and 41. The control valve includes five solenoids 63, 64, 66, 67 and 68 having cylindrical armatures 69, 71, 72, 73 and 74, respectively. The lower portions of the armatures comprise cylindrically-shaped slide selectors 76, 77, 78, 79 and 81 received in bores 82, 83, 84, 86 and 87 of housing 11. Springs 88, 89, 91, 92 and 93 are compressed between the bore ends and the selectors to bias the armatures upwardly into the normal positions as shown in FIGURE 2. A cover 94 is mounted on housing 11 to protect the solenoids.

A source of hydraulic pressure that is completely independent of the hydraulic brake system supplies fluid pressure to the control valve 10 through passage 96. A reservoir at atmospheric pressure communicates with the control valve through passage 97.

Slide selectors 77, 78, 79 and 81 are identical. Each has a lower annular groove, an upper annular groove and an internal vent passage leading from the upper groove to the base of the bore and spring. When the armatures are in normal positions as shown in FIGURE 2, the lower grooves permit communication between the source of pressure and compartments 37, 38, 39 and 41. When the armatures are depressed, communication between the corresponding compartments and the source of pressure is closed; however, upon depression of the armatures communication between the compartments and the reservoir opens to vent the compartments to atmospheric pressure. It is to be observed from FIGURES 2 and 3 that each selector may be depressed separately without effecting the compartments upstream or downstream of the actuated selector and its corresponding compartment.

Slide selector 76 differs from the other selectors in that it has only a single annular groove in addition to the vent passage leading from the groove to the base of the bore. Chamber 59 is at all times vented to the reservoir. Compartment 36 is vented to the reservoir when the selector 76 is in normal position and pressurized upon its depression.

OPERATION

Antiskid devices operate by releasing the brakes before the wheels lock and reapplying the brakes as the wheels regain speed. FIGURE 1 of the drawings shows diagrammatically an antiskid system that regulates the pressure of the rear wheel brake cylinders to prevent skidding of the vehicle rear wheels. It may be noted that prevention of rear wheel skid is a major factor in controlling directional stability and preventing slewing during emergency stops.

A conventional hydraulic brake system is confined to a fixed volume at all times. For example, a master cylinder displacement of 50 cc. produces a total, combined wheel cylinder displacement of 50 cc. During emergency stopping, brakes are often applied with excessive force which produces wheel lock and skidding. The pressure regulator 9 is installed in-line with hydraulic lines 14 and 16 between the master cylinder 12 and the wheel cylinder 13 and converts the brake system from a fixed volume system during normal braking operations to a variable volume system under skid conditions. The regulator 11 includes a chamber 17 in line with the brake line in which a piston means 26 is withdrawn in controlled steps to close off the hydraulic line 14 from the master cylinder 12 and to increase the volume of the remainder of the hydraulic system, thereby decreasing the pressure to and displacement of the wheel cylinder 13.

In the system illustrated in FIGURE 1, a wheel skid is detected by a sensor which transmits an appropriate electrical signal to the control valve. The sensor may be of a type known in the art which compares the angular deceleration of the vehicle wheel with the linear deceleration of the vehicle. The control valve 10, described previously and illustrated in FIGURES 1 and 2, is capable of responding in 15 distinct ways. Thus a sensor which can respond with 15 distinct signals is necessary. For a mild skid condition, the sensor would give a signal of a magnitude "1"; for a medium skid condition, a signal of a magnitude "8"; and for a severe skid condition, a signal of a magnitude "15". A severe skid condition is one in which the angular deceleration of the braked wheel greatly exceeds the linear deceleration of the vehicle in the direction of travel. For example, a vehicle traveling at 30 m.p.h. on an iced road surface with the wheels locked in panic braking would be experiencing a more severe skid condition than a vehicle traveling at the same speed on a dry road surface with the wheels locked. This is true because while the wheel decelerations may be approximately the same under the two situations, the vehicle deceleration on the dry surface is much greater than on the iced surface.

Piston means 26 of chamber 17 is connected to a series of divider pistons 31, 32, 33 and 34 loosely joined in a common cylindrical enclosure 29. The connections between the successive pistons 31, 32, 33 and 34 have clearances of axial distances S, 2S, 4S and 8S, respectively, where S is the length of the relative axial movement permitted by the slotted connection between pistons 31 and 32. The successive clearances between pistons may be stated as a series: S, 2S, 4S . . . $2^{n-1}$ S, where $n$=the number of divider pistons in the assembly.

During normal braking operations in which no wheel skid is detected by the sensor, the brake system operates as a fixed volume system as shown in FIGURE 2. Hydraulic fluid is free to pass through valve 22, port 19, and chamber 17 as the brakes are applied and through both valves 19 and 21 upon release of the brakes. Piston 26 is prevented from withdrawing to increase the volume of chamber 17 by the combined forces of the spring 61 and the fluid pressure within the enclosure 29 acting on piston 31.

During braking in which an undesirable degree of wheel skid is detected by the sensor, the control valve 10 and the pressure regulator 9 function to increase the volume of chamber 17 and thereby to release pressure from the controlled wheel cylinders. For example, a mild skid condition of a magnitude "1" on a fifteen gradation scale will be considered. The sensor causes solenoids 63 and 64 to be energized, which in turn cause the armatures 69 and 71 and selectors 76 and 77, respectively, to be depressed into the positions as shown in FIGURE 3. Chamber 59 continues to be vented to the reservoir unaffected by the depressed position of selector 76 of armature 69. Compartment 36 becomes pressurized as the vent passage closes and the passage connecting the source of pressure opens. Compartment 37, on the other hand, becomes vented to the atmosphere upon depression of selector 77. Compartment 37 then collapses as the fluid pressures in compartment 36 and chamber 17 force piston 31 toward piston 32 an amount equal to the clearance length S, and piston 26 is withdrawn from chamber 17 an equal amount. The withdrawal of piston 26 has two effects: first, it closes valve 22 so as to separate the master cylinder 12 from the wheel cylinder 13 and, secondly, it increases the volume of the remainder of the brake system thereby reducing the pressure to the wheel cylinder 13 and preventing wheel lock.

The operation is similar for an average skid condition. Assuming that the sensor detected the skid to be of a magnitude "7" in the range of discrete intervals from 1 to 15, the sensor would cause the first four solenoids 63, 64, 66 and 67 to be energized, thereby depressing armatures 69, 71, 72 and 73 and their selectors 76, 77, 78 and 79, respectively. Chamber 59 remains at atmospheric pressure, compartment 36 becomes pressurized, compartments 37, 38 and 39 are opened to the reservoir at atmospheric pressure, and compartment 41 remains pressurized. Compartments 37, 38 and 39 then collapse resulting in the withdrawal of piston means 26 from chamber 17 an amount equal to the sum of the clearances $(S+2S+4S=7S)$ of the first three piston connections.

If the sensor signal was of a magnitude "13," then solenoids 63, 64, 67 and 68 would be energized resulting in displacements of $S+4S+8S$ or a total of 13S.

Whenever the sensor detects a skid condition, solenoid 63 plus one or a combination of the other solenoids are energized. Selector 76 of armature 69 vents compartment 36 to the reservoir during normal, nonskid braking; upon initial occurrence of wheel skid, selector 76 connects compartment 36 to the pressure source to assist the pressure chamber 17 to move piston means 26 rightwardly. Accordingly, compartment 36 is dissimilar in function to the collapsible compartments 37, 38, 39 and 41.

The drawings illustrate a four piston regulator embodiment having a responding range divisible into 15 discrete intervals. The scope of the invention includes other embodiments having fewer or more pistons. For example, a three piston embodiment has a responding range divisible into seven discrete intervals $(S+2S+4S=7S)$, while a five piston embodiment has a responding range divisible into 31 discrete intervals $$(S+2S+4S+8S+16S=31)$$

The choice of the number of divider pistons depends, therefore, on the number of discrete divisions of the responding range which the task to be performed requires.

The pressurized fluid entering the control valve 10 through passage 96 is preferably a standard liquid hydraulic brake fluid. Other fluids may be used, including air, with suitable obvious modifications.

The foregoing description presents the presently preferred embodiment of the invention. Further modifications and alterations will occur to those skilled in the art that are included within the scope and spirit of the invention.

What is claimed is:

1. A device to regulate pressure within a hydraulic system comprising:
   a housing,
   a chamber formed within said housing in communication with a portion of said hydraulic system,
   movable means within said housing constructed to increase and decrease the volume of said chamber,
   first and second means constructed to move said movable means in discrete incremental intervals,
   said second means interconnecting said first means and said housing.

2. A device according to claim 1 and including:
   said chamber having inlet and outlet ports and forming a portion of the transmission line of the hydraulic system,
   valve means engageable with said inlet port to close said chamber from a portion of the hydraulic system,
   said valve means being engaged by said movable means during normal operation of the hydraulic system thereby permitting free flow of hydraulic fluid through said chamber,
   said valve means engaging said inlet port upon withdrawal of said movable means from said chamber.

3. A device to regulate pressure within a hydraulic system comprising:
   a housing,
   a chamber formed within said housing being in communication with a transmission line of said hydraulic system,
   movable means within said housing constructed to increase and decrease the volume of said chamber,
   an enclosure formed within said housing,
   a plurality of partition elements slidingly and sealingly received within said enclosure,
   said partition elements being loosely linked in a chain-like manner and forming a plurality of collapsible compartments within said enclosure,
   one end of said plurality of partition elements being connected to said housing, another end of said plurality of partition elements being connected to said movable means,
   whereby upon pressurization of said compartments said movable means is displaced into said chamber to reduce the volume of said chamber and upon release of pressure of one or more of said compartments said movable means is withdrawn from said chamber to increase the volume of said chamber.

4. A device according to claim 3 and including:
   said enclosure comprising a cylindrical cavity,
   said partition elements comprising pistons axially slidable within said cylindrical cavity.

5. A device according to claim 3 and including:
   said chamber having inlet and outlet ports and forming a portion of the transmission line of the hydraulic system,
   valve means engageable with said inlet port to close said chamber from a portion of the transmission line,
   said valve means being engaged by said movable means during normal operation of the hydraulic system thereby permitting free flow of hydraulic fluid through said chamber,
   said valve means engaging said inlet port upon withdrawal of said movable means from said chamber.

6. A device according to claim 3 and including:
   said movable means comprising a piston,
   a bore formed in said housing adjoining said chamber, said piston slidably received in said bore.

7. A device according to claim 6 and including:
   said enclosure comprising a cylindrical cavity, said partitions comprising pistons axially slidable within said cylindrical cavity.

8. A device according to claim 7 and including:
   said chamber having inlet and outlet ports and forming a portion of the transmission line of the hydraulic system,
   valve means engageable with said inlet port to close said chamber from a portion of the transmission line,
   said valve means being engaged by said movable means during normal operation of the hydraulic system thereby permitting free flow of hydraulic fluid through said chamber, said valve means engaging said inlet port upon withdrawal of said movable means from said chamber.

9. A device to modulate hydraulic line fluid pressure in an automobile hydraulic brake system having a master cylinder, at least one wheel cylinder, and hydraulic lines connecting said master cylinder and each said wheel cylinder with said device, said device comprising a housing, a chamber formed in said housing and in communication with said hydraulic lines between the master cylinder and each said wheel cylinder, a bore formed in said housing opening into said chamber, piston means slidably received in said bore being axially movable to increase and decrease the volume of said chamber, said housing including a cylindrical enclosure, a number of axially slidable piston-type partitions received in said cylindrical enclosure and therewith defining a number of variable volume cylindrical compartments, a first of said partitions being connected to said piston means and movable therewith, a second of said partitions being loosely connected to said first partition having a connection clearance of an amount S, where S equals a predetermined axial length, said first and second partitions and a portion of said cylindrical enclosure defining a first cylindrical compartment, a third of said partitions being loosely connected to said second partition having a connection clearance of an amount 2S, said second and third partitions and another portion of said cylindrical enclosure defining a second cylindrical compartment, connecting means loosely linking said third partition and one end of said cylindrical enclosure having a connection clearance of an amount 4S, said third partition and another portion of said cylindrical enclosure defining, at least in part, a third cylindrical chamber, a source of fluid pressure independent of the brake system master cylinder, passage means communicating said source of pressure and said compartments, valve means adjacent said passage means constructed to selectively open and close said passage means thereby selectively pressurizing or venting said compartments, each of said compartments being pressurized during normal vehicle braking thereby positioning said piston means to minimize the chamber volume, said valve means selectively closing said passage means and separating said source of pressure from selected of said compartments causing one or more of said compartments to be vented and to collapse thereby withdrawing said piston means from said chamber an amount equal to the collapsed compartment connection clearances and correspondingly increasing the volume of said chamber.

10. A device according to claim 9 and including:

said chamber having inlet and outlet ports in communication with said hydraulic lines, second valve means engageable with said inlet port to close said chamber from a portion of said hydraulic lines, said second valve means being engaged by said piston means during normal operation of the brake system thereby permitting free flow of hydraulic fluid through said chamber, said valve means engaging said inlet port upon withdrawal of said movable means from said chamber.

References Cited

UNITED STATES PATENTS 2,914,359 11/1959 Yarber.
3,066,988 12/1962 McRae.
3,306,677 2/1967 Dewar et al. _____ 303—21

MILTON BUCHLER, Primary Examiner

JOHN J. McLAUGHLIN, Jr., Assistant Examiner

U.S. Cl. X.R.

188—181; 303—6, 68